United States Patent
Weaver

(10) Patent No.: US 6,527,005 B2
(45) Date of Patent: Mar. 4, 2003

(54) CONDENSATE BYPASS APPARATUS

(75) Inventor: Steven K. Weaver, Carmel, IN (US)

(73) Assignee: Radon Control, Inc., Carmel, IN (US)

(*) Notice: Subject to any disclaimer, the term of this patent is extended or adjusted under 35 U.S.C. 154(b) by 86 days.

(21) Appl. No.: 09/854,972

(22) Filed: May 14, 2001

(65) Prior Publication Data

US 2002/0166587 A1 Nov. 14, 2002

(51) Int. Cl.[7] ............................. F24F 7/06; F24F 11/00
(52) U.S. Cl. ...................... 137/312; 137/343; 137/357; 52/169.5; 405/129.7; 454/341; 454/909
(58) Field of Search .................... 52/169.5; 137/312, 137/343, 357; 405/129.7, 129.85, 229, 303; 454/341, 345, 909

(56) References Cited

U.S. PATENT DOCUMENTS

| | | | | |
|---|---|---|---|---|
| 4,988,237 A | * | 1/1991 | Crawshaw | 405/229 |
| 5,083,500 A | * | 1/1992 | Francis et al. | 454/341 |
| 5,101,712 A | * | 4/1992 | Dean, Jr. | 454/341 |
| 5,836,815 A | * | 11/1998 | Jennemann | 454/341 |

OTHER PUBLICATIONS

Consumer's Guide to Radon Reduction, published by United States Environmental Protection Agency; printed Apr. 16, 2001; date of publication unknown.
A Citizen's Guide to Radon (3rd Ed.), published by United States Environmental Protection Agency; printed May 10, 2001; date of publication unknown.
Home Buyer's and Seller's Guide to Radon, published by United States Environmental Protection Agency; printed Apr. 16, 2001; date of publication unknown.
Information from Radon Mitigation Services, Inc. website (www.radonfix.com); printed May 10, 2001; date of publication unknown.
Information from Radon Supply website (www.radonsupply.com); printed Mar. 10, 2001; date of publication unknown.
Frequently Asked Questions About Radon, published by United States Environmental Protection Agency; printed Mar. 24, 2001; date of publication unknown.
Hydro–Sep™ Water Separation Device for Exterior Mounted Active Radon Mitigation Systems; published by KT Ventures, Inc. of Colorado Springs, CO; date of publication unknown.
Portions of Installation Instructions published by Spruce Industries, Inc. of Ward Hill, MA; date of publication unknown.

* cited by examiner

Primary Examiner—George L. Walton
(74) Attorney, Agent, or Firm—Ice Miller; Thomas A. Walsh; Jay G. Taylor

(57) ABSTRACT

An apparatus for diverting condensate which forms inside an exhaust system. The exhaust system comprises an exhaust side in which condensate may be formed, a suction side, and an exhaust fan between the exhaust side and the suction side and coupled to each of the exhaust side and the suction side to form a conduit through which gaseous fluid may be conveyed. A hollow tube having a first open end and a second open end is provided. The first end is coupled to the exhaust side and the second end is coupled to the suction side so that the hollow tube communicates between the exhaust side and the suction side in a manner bypassing the exhaust fan. A means exists inside the exhaust side for diverting condensate away from the exhaust fan apparatus. The means is positioned to channel condensate into the first open end of the hollow tube.

19 Claims, 12 Drawing Sheets

CONDENSATE BYPASS APPARATUS

BACKGROUND

Radon is a gaseous, radioactive element occurring naturally in nearly all soils. Created by the natural decay of uranium, radon ordinarily escapes from the ground and evaporates harmlessly into the atmosphere. Problems arise, however, when a building, especially a residential building such as a house, impedes the release of radon from the ground into the atmosphere. Radon can enter the building through open sump pits, cracks and other holes in the foundation, and cavities inside foundation walls, such as in a basement wall having concrete block construction. A building can trap radon inside, where it can build up. High concentrations of radon are widely believed to contribute to lung cancer, particularly among cigarette smokers.

When testing of a building reveals a high concentration of radon, radon mitigation is recommended. There are several radon mitigation techniques known in the art that reduce the amount of radon that enters a building. The most basic technique comprises sealing cracks and other openings in the building's foundation. Sealing rarely is effective by itself, however. Those of skill in the art will appreciate that it is difficult to identify and permanently seal all places where radon may enter a building. In addition, normal settling of a building often opens new radon entry routes, and may reopen old ones.

Typically, sealing is accompanied by a technique known as "active depressurization." In a radon mitigation system employing active depressurization, a network of pipes is installed in or around the building. At least one open end of the network of pipes is placed in proximity to the radon emerging from the ground. An exhaust fan connected to the network of pipes creates a vacuum that draws radon-laced air into the pipe and expels it outside the building at a safe level above ground.

Different types of active depressurization are appropriate for different building foundations. If the building has a concrete slab foundation, or is over a basement with a concrete slab floor, the radon mitigation system usually comprises one of four types of active depressurization: subslab depressurization, drain tile depressurization, sump pit depressurization, or block wall depressurization. These techniques are not mutually exclusive. All, or any combination, of these techniques may be used in a given radon mitigation system.

Subslab depressurization is the most common radon mitigation technique. Depressurization pipes are inserted through the concrete slab into the crushed rock or soil underneath. Alternatively, depressurization pipes may be inserted below the concrete slab from outside the building. A fan connected to the pipes draws the radon gas from below the concrete slab and then releases it into the atmosphere.

If the building has drain tiles to direct water away from the foundation of the building, and if the drain tiles form a complete loop around the foundation, depressurization of these drain tiles also may be effective in reducing radon levels. Depressurization pipes are inserted into the drain tile loop. A fan connected to the pipes draws the radon gas from the drain tile loop and then releases it into the atmosphere.

If the building has sump pit containing a sump pump to remove unwanted water, the sump pit can be capped so that it can continue to drain water but also serve as depressurization point. A depressurization pipe is inserted into through the sump pit cap, and then a fan connected to the pipe draws the radon gas from the sump pit and then releases it into the atmosphere.

If the building's basement comprises a hollow concrete block foundation walls, the hollow spaces within the concrete block wall may be depressurized using a variation of the same technique.

If the building has a crawlspace with an earth or gravel floor, the radon mitigation system usually comprises a technique known as sub-membrane depressurization. According to this technique, the floor of the crawlspace is covered with a heavy plastic sheet. A depressurization pipe is inserted under the plastic sheet and then a fan connected to the pipe draws the radon gas from under the sheet and then releases it into the atmosphere.

Common to each of these radon mitigation systems using active depressurization techniques, is the use of a fan and a network of pipes to draw radon-laced air from the soil and exhaust it to the atmosphere at a safe level above ground. Frequently, the fan is installed in a weatherproof housing located outside the building and slightly above ground level. This location reduces noise load the fan might add if installed inside the building, and permits easy access to the fan for maintenance. The depressurization pipes mate with one side of the fan housing, and an exhaust pipe extends from the opposite side of the fan housing to a predetermined level above ground.

The radon-laced air drawn into a radon mitigation system comprising active depressurization, such as those described herein, normally is about 55° F. year-round, and often comprises a high relative humidity. A problem arises when this warm, moist air reaches the exhaust pipe. In colder climates, the air in the exhaust pipe may be chilled below its dew point, causing the moisture in the air to condense on the inner surface of the exhaust pipe. In some circumstances, the quantity of the condensate formed within the exhaust pipe is such that the condensate drains down the inner surface of the exhaust pipe and into the fan housing, potentially damaging the exhaust fan and/or the exhaust fan motor. The owner then is faced with an unexpected, expensive repair. Therefore, it is desired to provide an apparatus for diverting the condensate that forms inside the exhaust pipe in a radon mitigation system away from the exhaust fan, thereby increasing the useful life of the exhaust fan. The desired apparatus will be easily installed, economic to manufacture, reasonably priced, and reliably constructed of readily available materials so that it will withstand exposure to the outdoor elements over many years of use.

SUMMARY

The present invention comprises an exhaust system for removing a radon from habitable areas of a building, including an apparatus for diverting condensate which forms within the system away from the exhaust fan, thereby avoiding damage to the exhaust fan and/or the exhaust fan motor and increasing the useful life of the exhaust fan and the exhaust fan motor.

The exhaust system of the present invention comprises an exhaust fan apparatus comprising having an exhaust port and a suction port and enclosing a fan. The operation of the fan draws a radon into the suction port and expels radon from the exhaust port.

One end of a hollow suction conduit is coupled to the suction port. The hollow suction conduit has an inner surface. At least one other end of the hollow suction conduit is located proximate to the radon gas, such as under the concrete slab or basement floor, within the drain tile loop, inside a sump pit, inside the cavities within a concrete block wall, or under s plastic membrane in a crawl space. The hollow suction conduit is otherwise substantially airtight. The operation of the fan draws radon gas into the end(s) of the hollow suction conduit located proximate to the radon gas, and causes the radon gas to be conducted through the hollow suction conduit to the suction port. The suction conduit may comprise a first hollow flexible coupling having an inner surface, a first open end, and a second open end. The first open end of the first hollow flexible coupling is coupled to the suction port, and the second open end is coupled to the suction conduit.

One end of a hollow exhaust conduit is coupled to the exhaust port. The hollow exhaust conduit has an inner surface. At least one other end of the hollow exhaust conduit is located at a predetermined level above ground level. The hollow exhaust conduit is otherwise substantially airtight. The operation of the fan expels radon gas from the exhaust port into the hollow exhaust conduit, and causes the radon gas to be conducted through the hollow exhaust conduit until it is expelled into the atmosphere. The exhaust conduit may comprise a second hollow flexible coupling having an inner surface, a first open end, a second open end. The first open end is coupled to the exhaust conduit, and the second open end is coupled to the exhaust port.

A hollow condensate trap is located within the exhaust conduit. The hollow condensate trap comprises a first open end and a second open end and a hollow interior communicating between the first open end and the second open end. The diameter of the first open end is less than the diameter of the second open end thereby resulting in a conically-shaped sloping outer surface to the condensate trap. The diameter of the second end of the condensate trap is dimensioned to fit within the exhaust conduit. The condensate trap is arranged within the exhaust conduit in a manner that precludes passage of the radon gas between the second open end of the condensate trap and the inner surface of the exhaust conduit. The axis of the condensate trap is substantially coincident with the axis of the exhaust conduit. Thus, a gutter is formed within the exhaust conduit. The gutter comprises the inner surface of the exhaust conduit and the sloping outer surface of the condensate trap. The gutter is positioned to collect condensate which may drain within the exhaust conduit.

A hollow bypass tube having a first open end and a second open end communicates between the exhaust conduit and the suction conduit in a manner bypassing the exhaust fan apparatus. The first open end of the bypass tube communicates through the exhaust conduit to the hollow interior thereof immediately adjacent to the conical surface of the condensate trap and within the gutter, and the second open end of the bypass tube communicates through the suction conduit to the hollow interior thereof. Thus, condensate collected in the gutter is conducting through the bypass tube into the suction conduit.

The hollow bypass tube may be installed by the use of a first and a second hollow bypass tube fitting. Each bypass tube fitting has a first open end and a second open end and a hollow interior communicating between the first open end and the second open end. The first open end of the first bypass tube fitting comprises an annular flange perpendicular to the axial direction of the bypass tube fitting. A surface of the annular flange of the first bypass tube fitting is engaged against the inner surface of the exhaust conduit, and a portion of the first bypass tube fitting is passed through a hole in a wall of the exhaust conduit, so that the second open end of the first bypass tube fitting ends up outside the exhaust conduit. The first open end of the first bypass tube fitting thus is positioned within the exhaust conduit to receive condensate from the gutter. Alternatively, the first open end of the first bypass tube fitting comprises external threads. The first open end of the first bypass tube fitting is threadably engaged with a hole in a wall of the exhaust conduit, so that the second open end of the first bypass tube fitting ends up outside the exhaust conduit.

The first open end of the second bypass tube fitting comprises external threads. The first open end of the second bypass tube fitting is threadably engaged with a hole in a wall of the suction conduit, so that the second open end of the second bypass tube fitting ends up outside the suction conduit. The first open end of the second bypass tube fitting thus is positioned within the suction conduit to deliver condensate to the suction conduit.

After the first and the second bypass tube fittings are positioned, the first open end of the bypass tube is coupled to the second open end of the first bypass tube fitting and the second open end of the bypass tube is coupled to the second open end of the second bypass tube fitting in a manner bypassing the exhaust fan. The condensate received from the gutter by the first open end of the first bypass tube fitting is conducting through the first bypass tube fitting and delivered from the second open end of the first bypass tube fitting into the bypass tube, then conducted through the bypass tube and delivered into the second open end of the second bypass tube fitting, then conducted through the second bypass tube fitting and delivered through the first open end of the second bypass tube fitting into the suction conduit.

These and other features and advantages of the present invention, and the manner of attaining them, will be more apparent and better understood by reference to the following descriptions of embodiments of the invention taken in conjunction with the accompanying drawings and with the appended claims.

DESCRIPTION

The present invention comprises a condensate bypass apparatus. A condensate bypass apparatus according to the present invention diverts the condensate that forms within the exhaust pipe in a radon mitigation system away from the exhaust fan, thereby avoiding damage to the fan and fan motor. To better illustrate the features and advantages of a condensate bypass system according to the present invention, it is useful to examine a prior art radon mitigation system, and to show and explain several approaches taken by others in this art in an attempt to solve the condensate formation problem.

Figure 1:
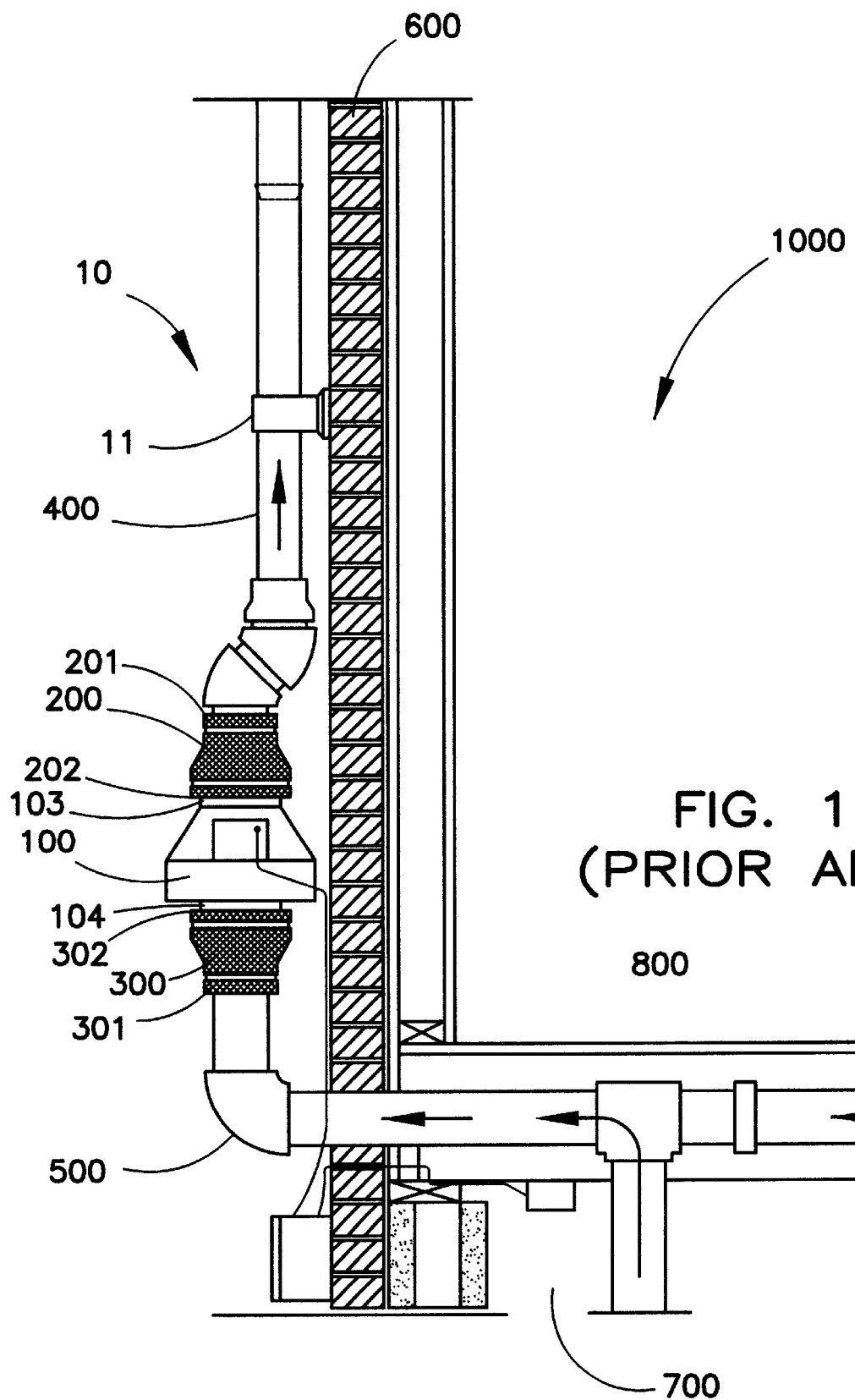
FIG. 1 shows a side elevational view of a prior art radon mitigation system comprising active depressurization.

FIG. 1 shows a side elevational view of a prior art radon mitigation system 10 comprising active depressurization according to a design well known in the radon mitigation art. Shown in FIG. 1 is radon mitigation system 10 comprising fan housing 100, exhaust port flexible coupling 200, suction port flexible coupling 300, exhaust pipe 400, and suction pipe 500. Also shown in FIG. 1 is structure 1000, comprising exterior wall 600, basement 700, and living space 800. Radon mitigation system 10 is attached to exterior wall 600 by means known in the radon mitigation art, such as by bracket 11.

Exhaust port flexible coupling 200 comprises a flexible, hollow coupling having a first open end 201 and a second open end 202. In FIG. 1, first open end 201 of exhaust port flexible coupling 200 is of one diameter and engaged with exhaust pipe 400, and second open end 202 of exhaust port flexible coupling 200 is of a second diameter and engaged with fan housing 100. In this arrangement, exhaust port flexible coupling 200 forms a conduit communicating between exhaust pipe 400 and fan housing 100. Circumscribing exhaust port flexible coupling 200 near each of first open end 201 and second open end 202, is an adjustable band which may be tightened after flexible coupling 200 is installed to secure flexible coupling 200 in place and to provide airtightness to the conduit formed by the flexible coupling. Exhaust port flexible coupling 200 may comprise a rubber coupling of a type well known in the art, or a coupling constructed of another flexible material capable of airtightly joining two conduits.

Suction port flexible coupling 300 also comprises a flexible, hollow coupling of the type well known in the art having a first open end 301 and a second open end 302. In FIG. 1, first open end 302 of suction port flexible coupling 300 is of one diameter and engaged with suction pipe 500, and second open end 302 of suction port flexible coupling 300 is of a second diameter and engaged with fan housing 100. In this arrangement, suction port flexible coupling 300 forms a conduit communicating between suction pipe 500 and fan housing 100. Circumscribing exhaust port flexible coupling 300 near each of first open end 301 and second open end 302 is an adjustable band which may be tightened after flexible coupling 300 is installed to secure flexible coupling 300 in place and to provide airtightness to the conduit formed by the flexible coupling. Exhaust port flexible coupling 300 may comprise a rubber coupling of a type well known in the art, or a coupling constructed of another flexible material capable of airtightly joining two conduits.

Suction pipe 500 comprises a pipe or a network of pipes for conducting radon-laced air from under structure 1000 to fan housing 100. In the prior art embodiment shown in FIG. 1, suction pipe 500 passes through exterior wall 600 from basement 700. Suction pipe 500 comprises one open end engaged with first open end 301 of suction port flexible coupling 300, and one or more open ends in proximity to radon-contaminated air or soil under structure 1000. Preferably, suction pipe 500 is otherwise airtight. Suction pipe 500 normally comprises a polyvinyl chloride ("PVC") pipe of the type well known in the art.

Exhaust pipe 400 comprises a pipe or a network of pipes for conducting radon-laced air from fan housing 100 to the atmosphere at a predetermined level above ground level. Exhaust pipe 400 comprises one open end beginning inside first open end 201 of exhaust port flexible coupling 200, and one or more open ends preferably positioned above the roof level of structure 1000. Preferably, exhaust pipe 400 is otherwise airtight. Exhaust pipe 400 normally comprises a PVC pipe of the type well known in the art.

Fan housing 100 comprises exhaust port 103, suction port 104, and a fan (not shown in FIG. 1) positioned inside fan housing 100 between exhaust port 103 and suction port 104. Exhaust port 103 and suction port 104 each comprise an opening in fan housing 100. Preferably, fan-housing 100 is otherwise airtight. Exhaust port 103 is engaged with second open end 202 of exhaust port flexible coupling 200. Suction port 104 is engaged with second open end 302 of suction port flexible coupling 300.

The fan within fan housing 100 is an exhaust fan of a type well known in the radon mitigation art. The fan is oriented within fan housing 100 such that when the fan is in operation, air is drawn into fan housing 100 through suction port 104, and expelled through exhaust port 103. Thus, when fan housing 100 is positioned within radon mitigation system 10 as shown in FIG. 1, the operation of the fan causes radon-laced air to be drawn into the one or more open ends of suction pipe 500 under structure 1000. The radon-laced air then is conducted through radon mitigation system 10 until it is expelled into the atmosphere through the one or more open ends of exhaust pipe 400. The direction of airflow while the exhaust fan is in operation is indicated by the arrows shown on exhaust pipe 400 and suction pipe 500 in FIG. 1.

All components below the exhaust fan, including without limitation suction port 104, suction port flexible coupling 300, and suction pipe 500, comprise the "suction side" of radon mitigation system 10. All components above the exhaust fan, including without limitation exhaust port 103, suction port flexible coupling 200, and suction pipe 400 comprise the "exhaust side" of radon mitigation system 10.

Figure 2:
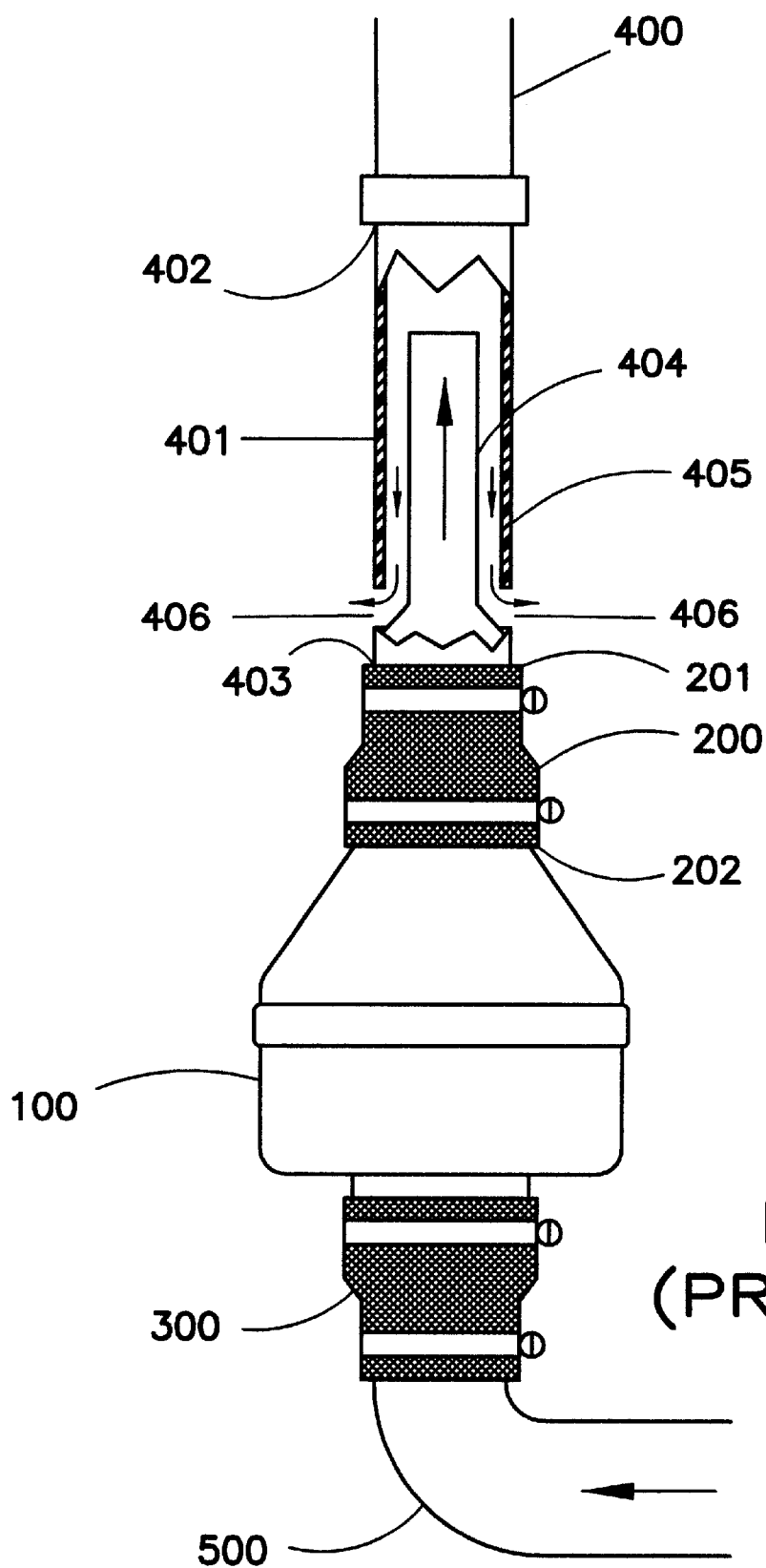
FIG. 2 shows a side elevational view of an embodiment of a prior art condensate diverting apparatus installed in a radon mitigation system, with a portion partially removed.

FIG. 2 shows a side elevational view of an embodiment of a prior art condensate diverting apparatus installed in a radon mitigation system, such as radon mitigation system 10 of FIG. 1. Shown in FIG. 2 is radon mitigation system 10 comprising fan housing 100, exhaust port flexible coupling 200, suction port flexible coupling 300, exhaust pipe 400, and suction pipe 500. Fan housing 100, exhaust port flexible coupling 200, suction port flexible coupling 300, and suction pipe 500 are connected as previously shown and described herein.

Also shown in FIG. 2 is condensate diverting device 401 installed in radon mitigation system 10 between exhaust port flexible coupling 200 and exhaust pipe 400. Condensate diverting device 401 comprises first end 402, second end 403, inner pipe 404, outer pipe 405, and one or more condensate escape holes 406. First end 402 is engaged with exhaust pipe 400, and second end 403 is engaged with first end 201 of exhaust port flexible coupling 200. The diameter of outer pipe 405 is substantially the same as the diameter of exhaust pipe 400. Each escape hole 406 comprises an aperture through outer pipe 405.

A portion of the wall of outer pipe 405 is shown in FIG. 2 as being removed to reveal the details of inner pipe 404, and relationship between inner pipe 404, outer pipe 405, and the one or more condensate escape holes 406. As illustrated in FIG. 2, inner pipe 404 comprises a nozzle having a larger diameter end oriented to capture all the air expelled through first end 201 of exhaust port flexible coupling 200, and a smaller diameter end through which the air is expelled into exhaust pipe 400. The larger arrow shown in FIG. 2 within inner pipe 404 illustrates the direction of the airflow through condensate diverting device 401. The cross-sectional area of inner pipe 404 perpendicular to the airflow is substantially smaller than the cross-sectional area of first end 201 of exhaust port flexible coupling 200 perpendicular to the airflow. Thus, the flow of the radon-laced air is restricted by inner pipe 404.

When condensate forms inside exhaust pipe 400 and drains into condensate diverting apparatus 401 from exhaust pipe 400, the condensate moves down the inner surface of outer pipe 405 and is discharged through condensate escape holes 406, thus diverting condensate away from the exhaust fan. The smaller arrows shown in FIG. 2 between inner pipe 404 and outer pipe 405 illustrate the direction of the condensate flow through condensate diverting device 401.

The prior art condensate diverting apparatus shown in FIG. 2 possesses several disadvantages. First, because the cross-sectional area of inner pipe 404 perpendicular to the airflow is substantially smaller than the cross-sectional area of first end 201 of exhaust port flexible coupling 200 perpendicular to the airflow, the flow of the radon-laced exhaust is impeded. Thus, the load on the exhaust fan is increased, thereby reducing the useful life of the exhaust fan. In addition, because condensate is expelled through condensate escape holes 406 to the outside of radon mitigation system 10, in periods of subfreezing temperatures the condensate freezes on the outside of radon mitigation system 10. In particular, condensate freezes on the outside of fan housing 100. In long periods of subfreezing conditions, such as those which are experienced in the northern latitudes of the United States, a significant build-up of ice on the outside of fan housing 100 can be experienced and the condensate escape holes can become clogged by ice, thus causing condensate to accumulate and drip down onto the fan, thereby damaging the fan and the fan motor.

Figure 3:
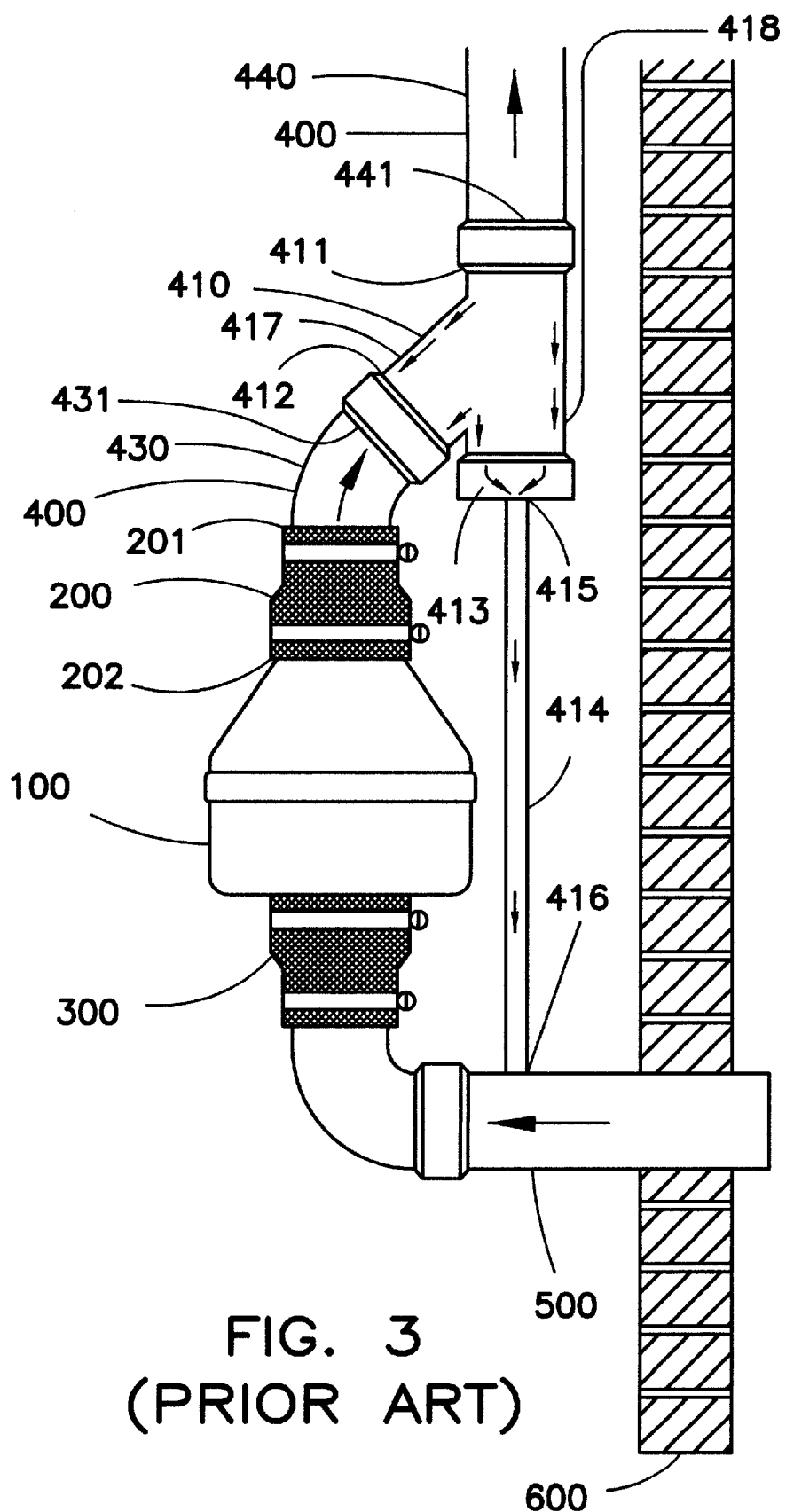
FIG. 3 shows a side elevational view of an embodiment of a second prior art condensate bypass apparatus installed in a radon mitigation system.

FIG. 3 shows a side elevational view of a second prior art condensate diverting apparatus installed in a radon mitigation system, such as radon mitigation system 10 of FIG. 1. Shown in FIG. 3 is radon mitigation system 10, comprising fan housing 100, exhaust port flexible coupling 200, suction port flexible coupling 300, exhaust pipe 400 comprising lower pipe 430 and upper pipe 440, and suction pipe 500. Fan housing 100, exhaust port flexible coupling 200, suction port flexible coupling 300, and suction pipe 500 are connected as previously shown and described herein. The direction of airflow through the radon mitigation system is indicated by the larger arrows shown on exhaust pipe 400 and suction pipe 500 in FIG. 3.

Also shown in FIG. 3 is wye pipe 410 installed between lower pipe 430 and upper pipe 440. Wye pipe 410 comprises a 45-degree (45°) wye pipe of a type well known in the art. Wye pipe 410 comprises first end 411, first fork 417 terminating in second end 412, and second fork 418 terminating in third end 413. First end 411 is engaged with upper pipe 440. Second end 412 is engaged with lower pipe 430.

Also shown in FIG. 3 is a hollow drain tube 414 comprising first end 415 and second end 416. Drain tube 414 is a hollow tube of significantly smaller diameter than exhaust pipe 400 or suction pipe 500. First end 415 and second end 416 are open. First end 415 of drain tube 414 extends through the third end 413 of wye pipe 410. Second end 416 of drain tube 414 extends through the side of suction pipe 500. In this arrangement, hollow drain tube 414 communicates between wye pipe 410 and suction pipe 400.

According to this prior art condensate diverting apparatus, when condensate forms inside exhaust pipe 400 and drains into wye pipe 410 from exhaust pipe 400, much of the condensate moves down the inner surface of second leg 418 and collects in third end 413. The condensate then enters open end 415 of drain tube 414 and is conducted through drain tube 414 and open end 416 into suction pipe 500. The smaller arrows shown in FIG. 3 on wye pipe 410 and drain tube 414 illustrate the direction of the condensate flow through drain tube 414.

The prior art condensate diverting apparatus shown in FIG. 3 possesses several disadvantages. First, not all of the condensate which forms inside exhaust pipe 400 is delivered to suction pipe 500 through drain tube 414. Instead, some condensate drains down first leg 417, through lower pipe 430, and into fan housing 100, potentially damaging the exhaust fan. The smaller arrows shown in FIG. 3 on first leg 417 illustrate the direction of this condensate flow. In addition, adding wye pipe 410 to radon mitigation system 10 increases the cost of radon mitigation system 10. The cost of the wye pipe and several extra pipe couplings are incurred, as well as the cost of the extra labor required to assemble the apparatus shown in FIG. 3. Finally, adding wye pipe 410 to radon mitigation system 10 as shown in FIG. 3 requires additional clearance between fan housing 100 and exterior wall 600. Such an arrangement may be considerably less desirable or aesthetically pleasing to the resident or owner of structure I 000.

Figure 4:
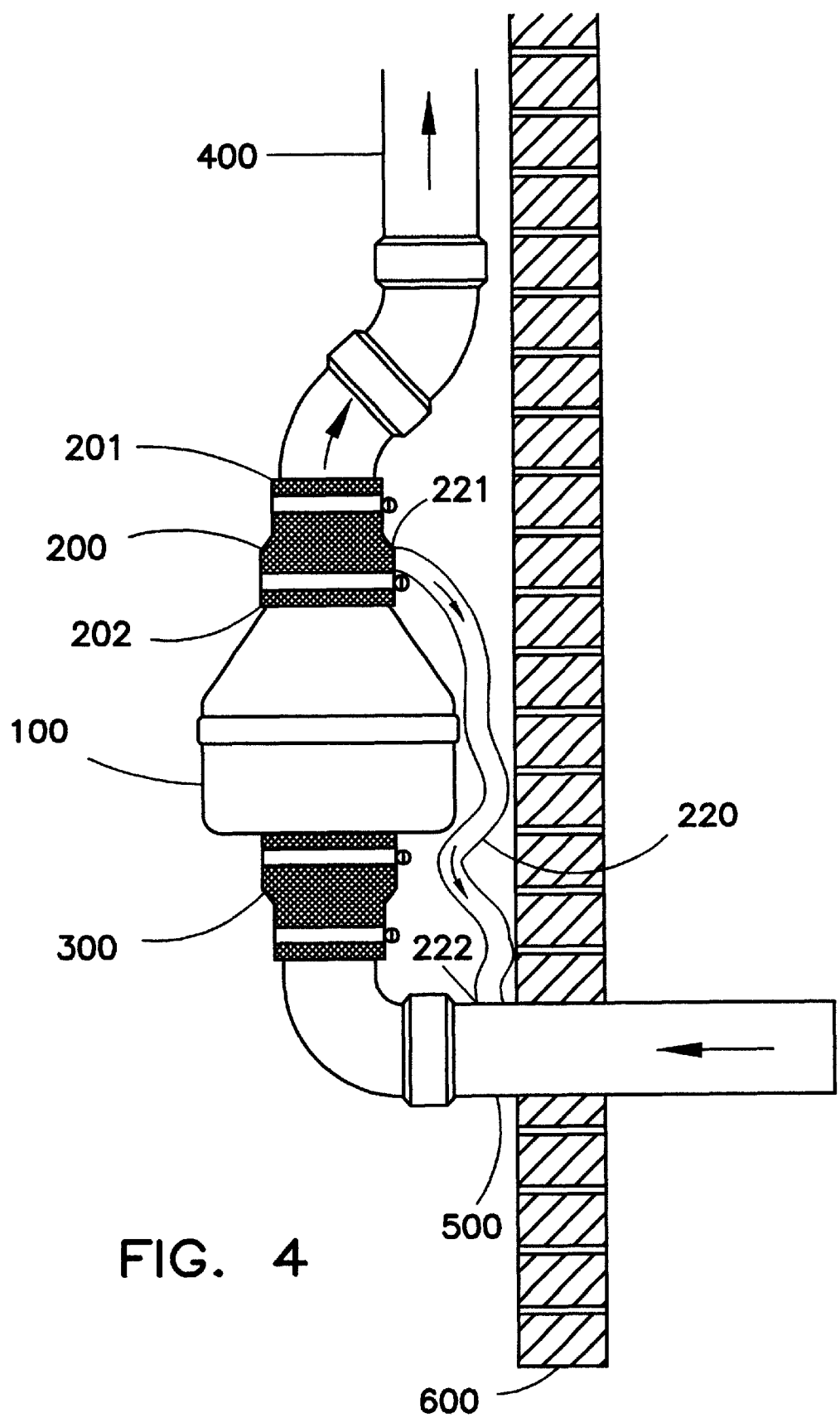
FIG. 4 shows a side elevational view of an improved condensate bypass apparatus according to the present invention.

An improved condensate bypass apparatus according to the present invention is shown in side elevational view in FIG. 4, as installed in a radon mitigation system such as radon mitigation system 10 of FIG. 1. Shown in FIG. 4 is radon mitigation system 10 comprising fan housing 100, exhaust port flexible coupling 200, suction port flexible coupling 300, exhaust pipe 400, and suction pipe 500. Fan housing 100, exhaust port flexible coupling 200, suction port flexible coupling 300, exhaust pipe 400, and suction pipe 500 are connected as previously shown and described herein. The direction of airflow through the radon mitigation system is indicated by the larger arrows shown on exhaust pipe 400 and suction pipe 500 in FIG. 4.

Also shown in FIG. 4 is bypass tube 220. Bypass tube 220 comprises a flexible tube having first open end 221 and second open end 222 and a continuous hollow interior communicating between first open end 221 and second open end 222. First open end 221 communicates with the interior of exhaust port flexible coupling 200. Second open end 222 communicates with the interior of suction pipe 500. In this arrangement, exhaust port flexible coupling 200 communicates with suction pipe 500 through the hollow interior of bypass tube 220. As will be discussed in more detail hereinafter, condensate is diverted away from exhaust port 103 of fan housing 100 inside exhaust port flexible coupling 200, and conducted through bypass tube 220 into suction pipe 500. The condensate thereby is diverted away from the exhaust fan and fan motor inside fan housing 100. The smaller arrows shown in FIG. 4 on bypass tube 220 illustrate the direction of the condensate flow through bypass tube 220.

Figure 5:
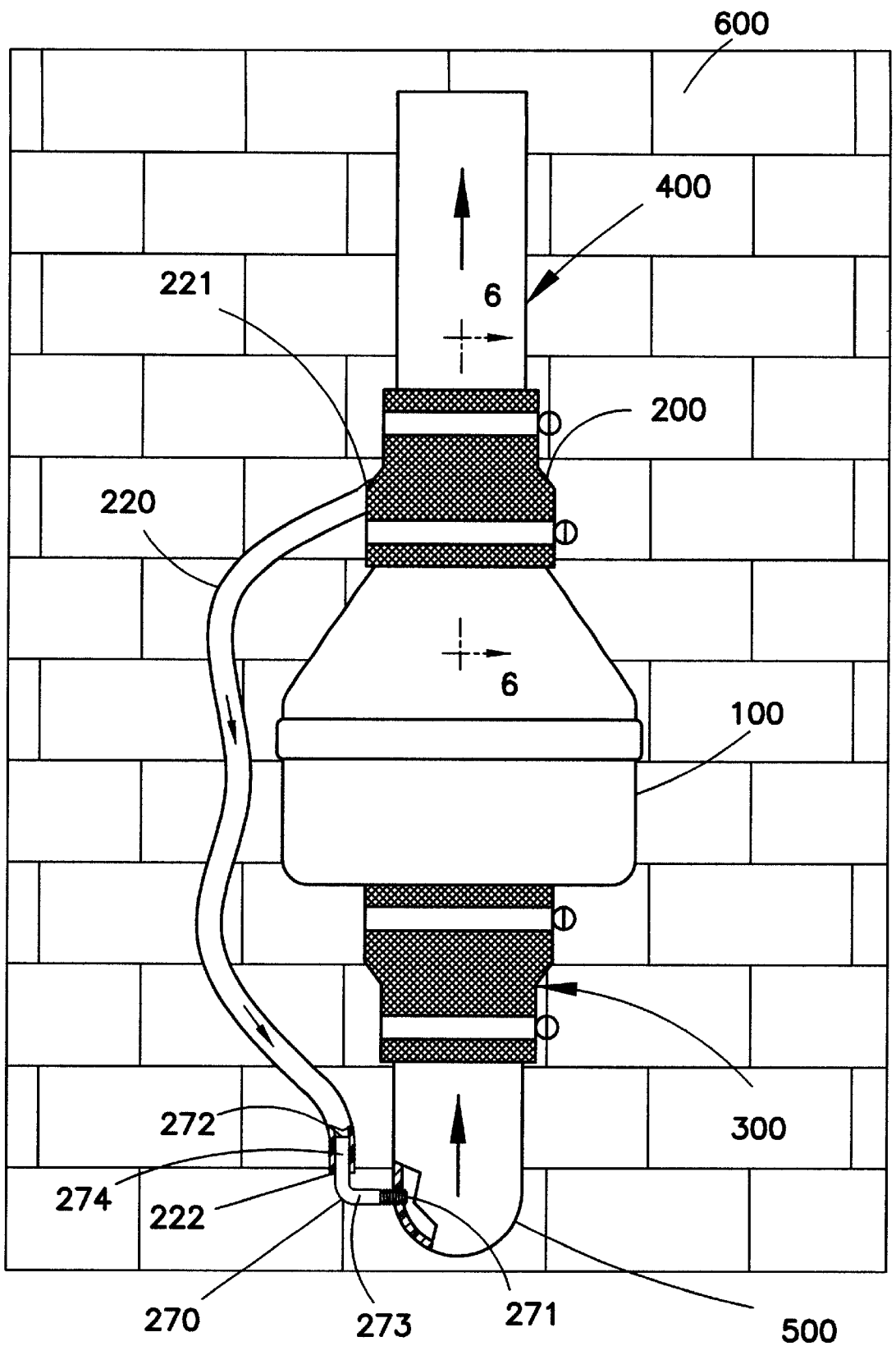
FIG. 5 shows a front elevational view of an improved condensate bypass apparatus according to the present invention.

FIG. 5 shows a front elevational view of the condensate bypass apparatus of FIG. 4. Shown in FIG. 5 are fan housing 100, exhaust port flexible coupling 200, bypass tube 220, suction port flexible coupling 300, exhaust pipe 400, and suction pipe 500. Also shown in FIG. 5 is exterior wall 600 of structure 1000. The direction of airflow through the radon mitigation system is indicated by the larger arrows shown on exhaust pipe 400 and suction pipe 500 in FIG. 5. The smaller arrows shown in FIG. 5 on bypass tube 220 illustrate the direction of the condensate flow through bypass tube 220.

Figure 6:
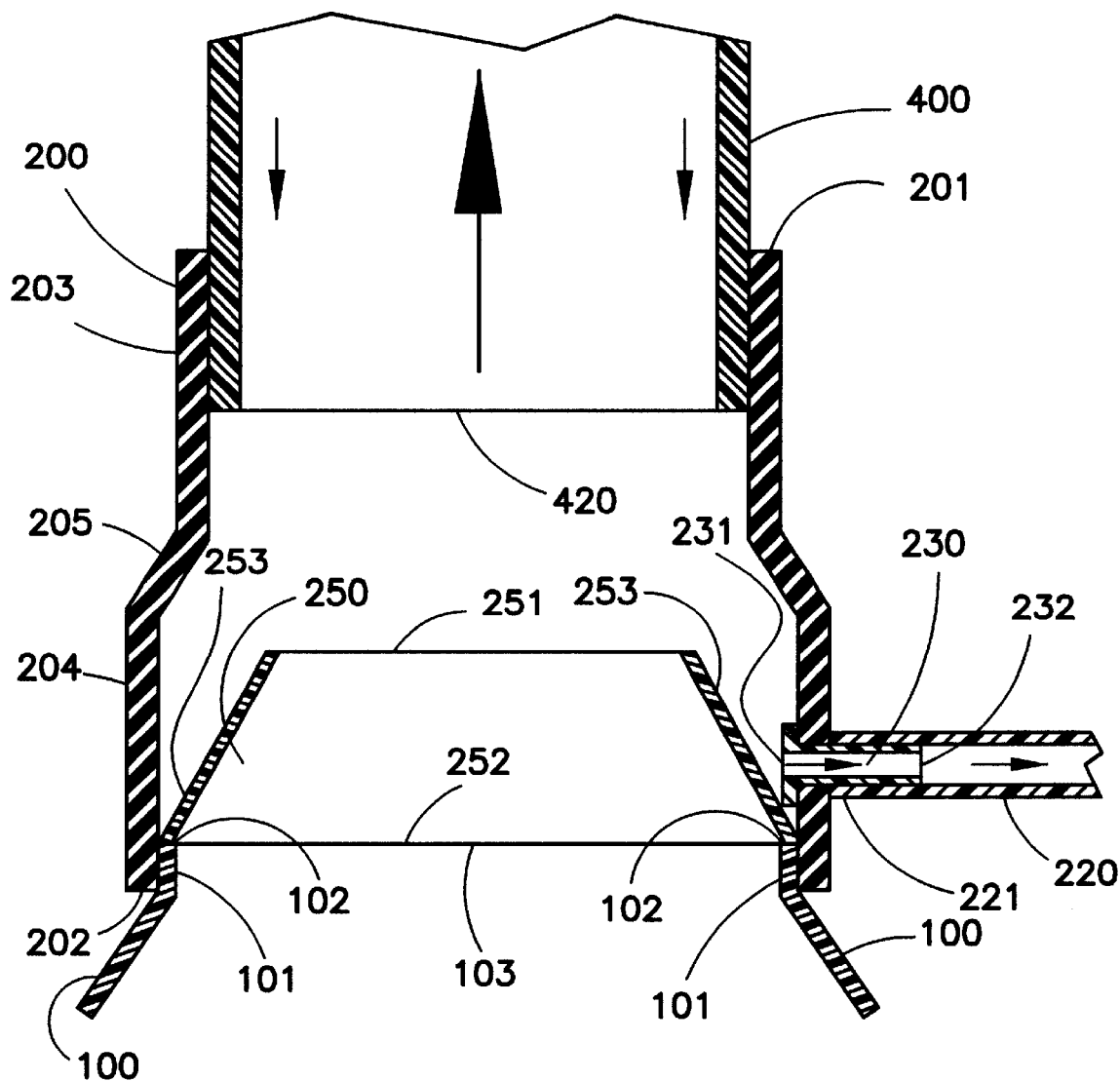
FIG. 6 shows a cross sectional side view of a first embodiment of an improved condensate bypass apparatus according to the present invention taken along line 6—6 of FIG. 5.

FIG. 6 shows a cross sectional side view of an embodiment of the condensate bypass apparatus shown in FIGS. 4–5. Shown in FIG. 6 are exhaust port 103 of fan housing 100, exhaust port flexible coupling 200, bypass tube 220, bypass tube fitting 230, condensate trap 250, and exhaust pipe 400 having a first end 420. Exhaust port 103 has an exhaust port annular lip 101 that engages the interior edge of flexible coupling 200 and terminates at exhaust port annular rim 102. Exhaust port flexible coupling 200 comprises first end 201, second end 202, smaller diameter segment 203, larger diameter segment 204, and transition segment 205.

Bypass tube fitting 230 comprises a hollow tube having a first open end 231 and a second open end 232, and a continuous hollow interior communicating between first open end 231 and second open end 232. Bypass tube fitting 230 preferably is constructed from a substantially rigid, corrosion-resistant material, such as stainless steel or a substantially rigid plastic material. First open end 231 comprises an annular flange perpendicular to the axial direction of the bypass tube fitting 230. Second end 232 of tube fitting 230 is sized to mate with end 221 of bypass tube 220. Bypass tube fitting 230 is installed from the inside of exhaust port flexible coupling 200 through an appropriately sized hole formed through segment 204 of exhaust port flexible coupling 200.

Condensate trap 250 comprises a hollow device having first open end 251 and second open end 252, and a continuous hollow interior communicating between first open end 251 and second open end 252. Condensate trap 250 preferably is constructed from a corrosion-resistant material, such as stainless steel or a plastic material. Condensate trap 250 is formed in a truncated conical shape with a sloping outer surface 253. Thus, first open end 251 comprises a diameter smaller than second open end 252. Second open end 252 comprises a diameter substantially the same as that circumscribed by exhaust port annular rim 102. First open end 251 comprises a diameter smaller than the inner diameter of exhaust pipe 400. Preferably, the diameter of first open end 251 is only slightly smaller than the inner diameter of exhaust pipe 400, to provide as little impediment to airflow as possible.

The condensate bypass apparatus shown in FIG. 6 is assembled according to the following process. First, a hole of a predetermined size is made through larger diameter segment 204 of flexible coupling 200. The hole through segment 204 is sized to permit second open end 232 of bypass tube fitting 230 to pass therethrough, but to prevent the annular flange of first end 231 of bypass tube fitting 230 from passing therethrough. Bypass tube fitting 230 is inserted from the inside of flexible coupling 200 so that the annular flange on end 231 is engaged against the inner surface of flexible coupling 200, and second end 232 of bypass tube fitting 230 protrudes through to the outside of flexible coupling 200. First end 221 of bypass tube 220 then is fitted onto second end 232 of bypass tube fitting 230. First end 221 is retained on second end 231 of bypass tube 230, such as by friction, by use of an adhesive, or by use of an appropriate strap fastener.

Next, condensate trap 250 is installed on fan housing 100. In the embodiment shown in FIG. 6, condensate trap 250 is placed on top of exhaust port annular rim 102, with second end 252 of condensate trap 250 engaged on top of exhaust port annular rim 102 substantially throughout the entire circumference thereof In some implementations of the present invention, condensate trap 250 may be held in place against exhaust port annular rim 102 through the use of an adhesive. Optionally, exhaust port annular rim 102 may comprise a groove extending throughout the circumference of exhaust port annular rim 102 into which second end 252 of condensate trap 250 is inserted during assembly. In this embodiment, condensate trap 250 may be held in place within the groove in exhaust port annular rim 102 through the use of an adhesive.

After bypass tube 220 and condensate trap 250 are in place, second end 202 of flexible coupling 200 is engaged with exhaust port annular lip 101 of fan housing 100. Next, first end 420 of exhaust pipe 400 is engaged with first end 201 of flexible coupling 200. For proper operation of this embodiment of a condensate bypass apparatus according to the present invention, first end 420 of exhaust pipe 400 must not be in contact with condensate trap 250 after installation.

In the final step, second end 222 of bypass tube 220 is engaged with suction pipe 500 (see FIG. 5). Installation of second end 222 is similar to installation of first end 221 of bypass tube 220. A second bypass tube fitting 270 is provided. Bypass tube fitting 270 comprises a hollow tube having a first leg 273 terminating in a first open end 271, a second leg 274 terminating in a second open end 272, and a continuous hollow interior communicating between first open end 271 and second open end 272. Bypass tube fitting 270 preferably is constructed from a substantially rigid, corrosion-resistant material, such as stainless steel or a substantially rigid plastic material. A portion of the external surface of first leg 273 comprises threads. Second open end 272 of tube fitting 270 is sized to mate with second open end 222 of bypass tube 220. In the embodiment shown in FIG. 5, bypass tube fitting 270 is provided in a right angle configuration, but this is not required. Bypass tube fitting 270 may be straight, or may be configured in an angle other than a right angle. Preferably, bypass tube fitting 270 is not configured in an acute angle.

A hole of a predetermined size is made through suction pipe 500, and internally threaded. The hole through suction pipe 500 is sized to receive first open end 271 and threaded to mate with first leg 273. Bypass tube fitting 270 is inserted into the hole from the outside of suction pipe 500 by engaging the external threads on first leg 273 with the internal threads in the hole through suction pipe 500. Bypass tube fitting 270 is inserted in this manner until first open end 271 is at least flush with the inner surface of suction pipe 500. Bypass tube fitting 270 may be inserted until first open end 271 extends slightly into the hollow interior of suction pipe 500. Second end 222 of bypass tube 220 then is fitted over second end 272. Second end 222 of bypass tube 220 is retained on second leg 274 of bypass tube fitting 270, such as by friction, by use of an adhesive, or by use of an appropriate strap fastener. The external surface of second leg 274 of bypass tube fitting 270 may comprise one or more annular barbs which enhance the retention of second end 222 of bypass tube 220 thereon.

When the exhaust fan is in operation, the radon-laced air is conducted through the system. The direction of airflow is indicated by the larger arrow shown inside exhaust pipe 400. If the radon-laced air is chilled below its dew point, condensate forms on the inner surfaces of exhaust pipe 400. In some circumstances, the quantity of the condensate formed within exhaust pipe 400 is such that the condensate drains down the inner surface of exhaust pipe 400. Condensate that reaches first end 420 of exhaust pipe 400 either drips onto condensate trap 250 or flows along the interior surface of flexible coupling 200 until it contacts condensate trap 250. Condensate trap 250 and the inner surface of segment 204 of exhaust port flexible coupling 200 form a "gutter" inside flexible coupling 200 that retains the condensate which drips from exhaust pipe 400.

When the level of condensate in this gutter rises above the level of first open end 231 of bypass tube fitting 230, the condensate enters first open end 231, where it is conducted through bypass tube fitting 230 to bypass tube 220, and then through bypass tube 220 into suction pipe 500. The smaller arrows shown in FIG. 6 near the inner surface of exhaust pipe 400, in bypass tube fitting 230, and in bypass tube 220 illustrate the direction of the condensate flow.

When the exhaust fan is in operation, the air pressure within suction pipe 500 is less than the air pressure within exhaust port flexible coupling 200. Thus, a slight vacuum is created within bypass tube 220 as the system attempts to draw air from exhaust port flexible coupling 200 through bypass tube 220 into suction pipe 500 to equalize the pressure. This flow of air through bypass tube 220 accelerates the flow of condensate through bypass tube 220, reducing the opportunity for the condensate to freeze inside bypass tube 220 and improving the efficiency of the condensate bypass apparatus.

When installed, bypass tube 220 and bypass tube fittings 230 and 270 together are configured to inhibit pooling of condensate within the conduit formed by the hollow interiors of bypass tube 220 and bypass tube fittings 230 and 270. Preferably, the length of bypass tube 220 is dimensioned to fit slackly between bypass tube fittings 230 and 270. However, when installed bypass tube 220 preferably is devoid of sags or loops within which condensate may pool. If condensate pools within bypass tube 220, the efficiency of the system may degrade. Similarly, bypass tube fitting 270 should be installed into suction pipe 500 so that the condensate which enters bypass tube fitting 270 from bypass tube 220 is not retained inside bypass tube fitting 270.

Figure 7:
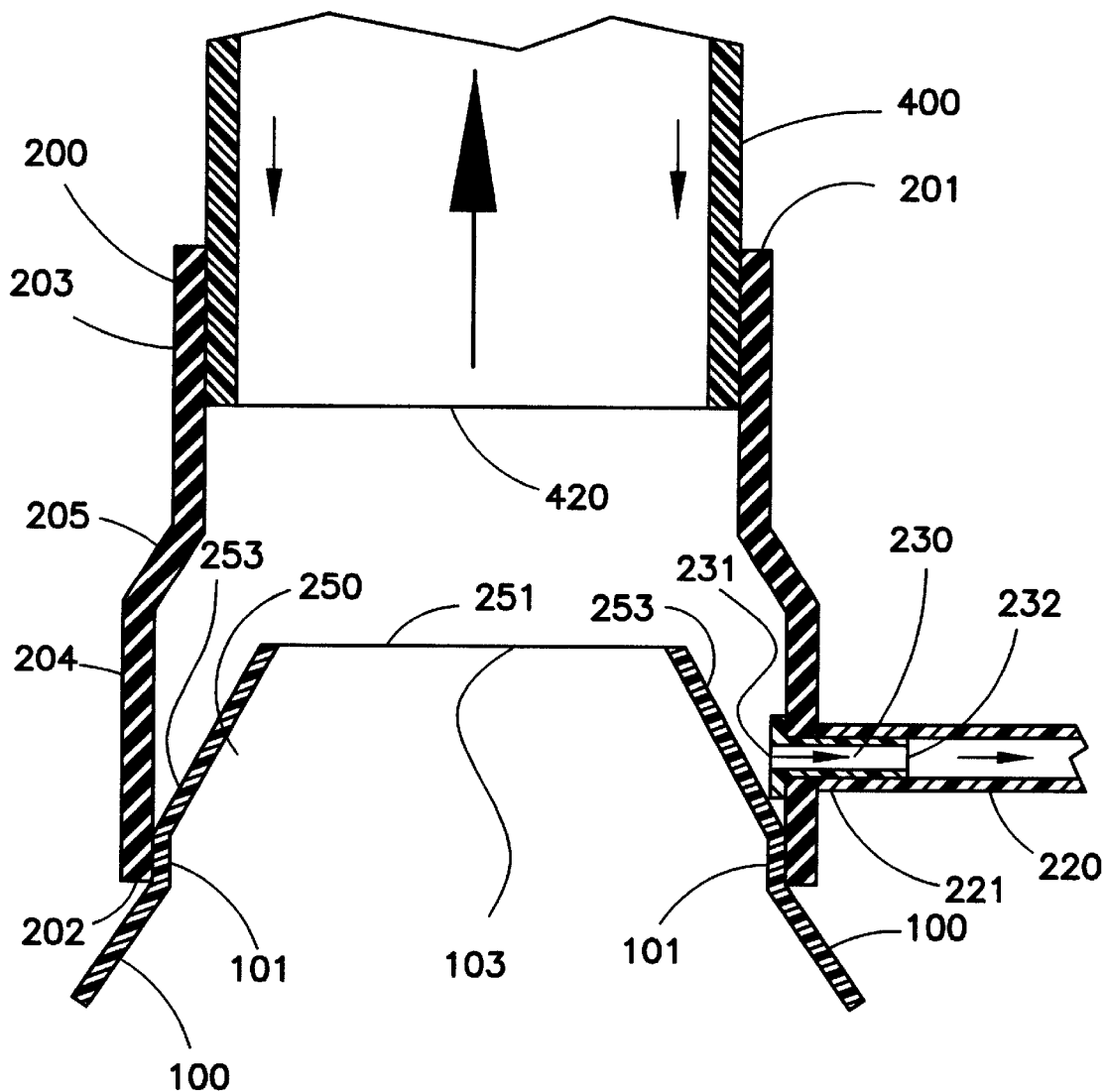
FIG. 7 shows a cross sectional side view of a second embodiment of an improved condensate bypass apparatus according to the present invention taken along line 6—6 of FIG. 5.

Another embodiment of the condensate bypass apparatus according to the present invention shown in a cross sectional side view in FIG. 7. In this embodiment, condensate trap 250 is integrally formed with exhaust port annular lip 101. In this embodiment, there is no exhaust port annular rim 102 or second end 252 of condensate trap 250, nor is there a need to place condensate trap 250 on top of fan housing 100 during installation. Instead, the material comprising exhaust port annular lip 101 is integrally formed during manufacture of fan housing 100 to take on the shape of condensate trap 250 as shown in FIG. 7 and described herein. Exhaust port annular lip 101 terminates in first end 251 of condensate trap 250 in this embodiment. As before, for proper operation of this embodiment of a condensate bypass apparatus according to the present invention, first end 420 of exhaust pipe 400 must not be in contact with condensate trap 250 after installation.

Figure 8:
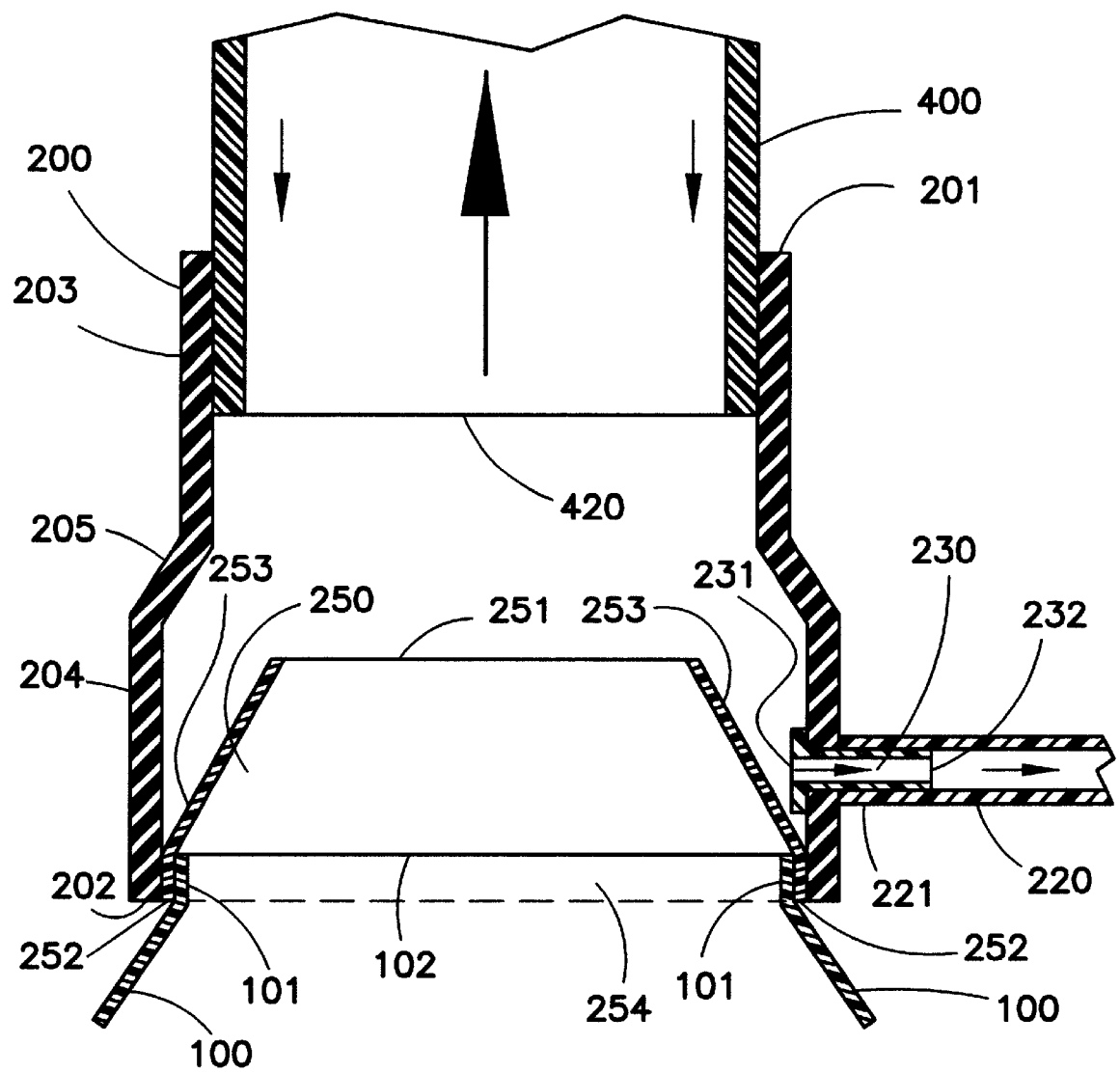
FIG. 8 shows a cross sectional side view of a third embodiment of an improved condensate bypass apparatus according to the present invention.

FIG. 8 shows a cross sectional side view of another embodiment of the condensate bypass apparatus of the present invention. In the embodiment shown in FIG. 8, condensate trap 250 comprises a hollow device of unitary construction comprising a first segment and a second segment. The first segment of condensate trap 250 is formed into a truncated conical shape with a sloping outer surface 253 terminating in first open end 251. The second segment of condensate trap 250 is formed into a cylindrical shape having a vertical outer surface 254 terminating in second open end 252. A continuous hollow interior communicates between first open end 251 and second open end 252.

The second segment of condensate trap 250 comprises a cylindrically shaped segment having dimensions of diameter and height that are slightly larger than the corresponding dimensions of exhaust port annular lip 101. Thus, the second segment of condensate trap 250 fits snugly over and around exhaust port annular lip 101, and is held in place between larger diameter segment 204 of exhaust port flexible coupling 200 and exhaust port annular lip 101. No adhesive is required to hold this embodiment of condensate trap 250 in place. As before, for proper operation of this embodiment of a condensate bypass apparatus according to the present invention, first end 420 of exhaust pipe 400 must not be in contact with condensate trap 250 after installation.

Figure 9A:
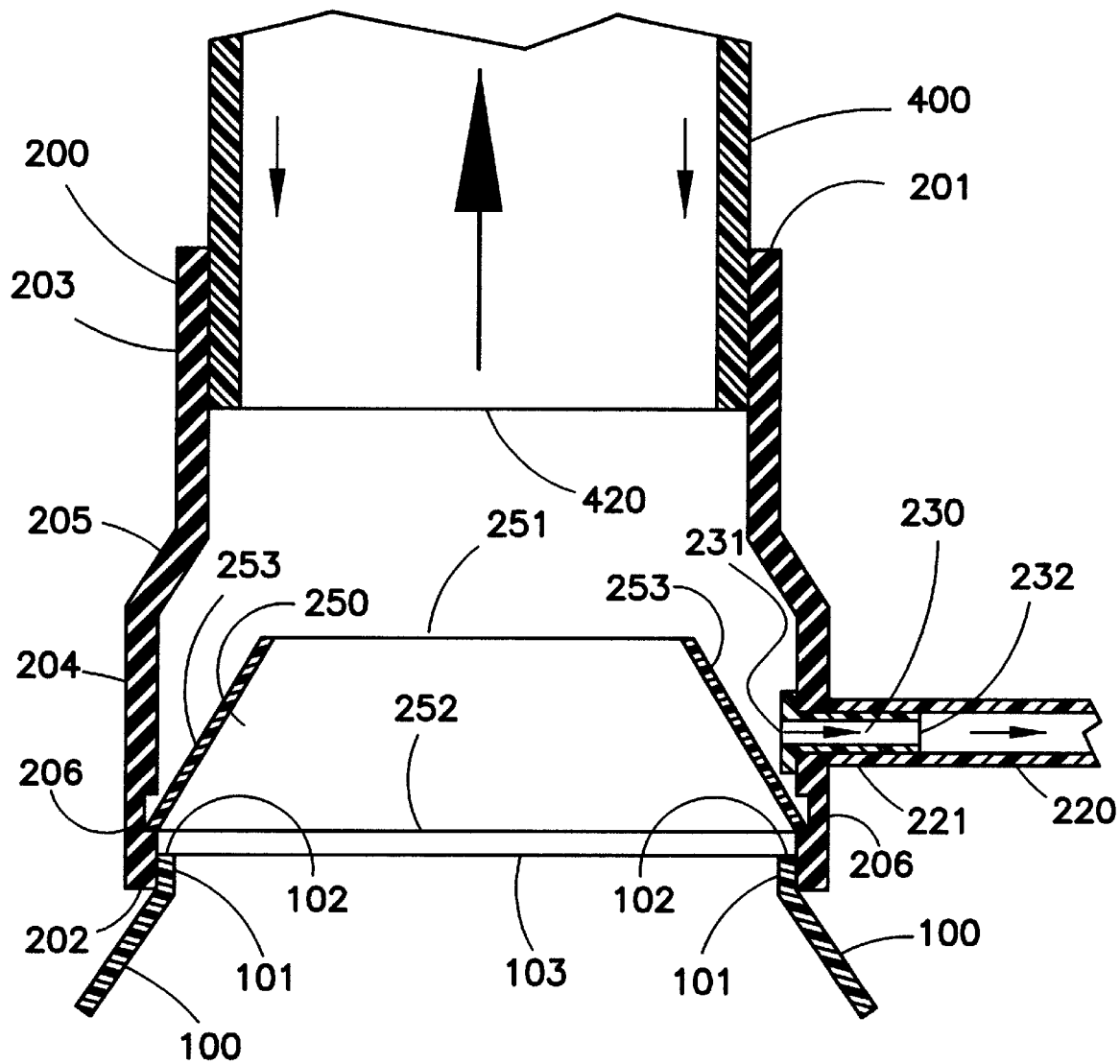
FIG. 9A shows a cross sectional side view of a fourth embodiment of an improved condensate bypass apparatus according to the present invention.

FIG. 9A shows a cross sectional side view of another embodiment of an improved condensate bypass apparatus according to the present invention. In FIG. 9A, exhaust port flexible coupling 200 further comprises inner annular groove 206. Inner groove 206 extends around the entire circumference of the inner surface of segment 204 of exhaust port flexible coupling 200. The annular edge of second end 252 of condensate trap 250 is inserted into inner groove 206 during assembly, and retained therein during use of the condensate bypass apparatus. The depth of inner groove is left to the discretion of the practitioner, however, inner grove 206 must be deep enough to retain second end 252 of condensate trap 250 during use, yet not so deep that the structural integrity required of exhaust port flexible coupling 200 in this application is compromised. Inner groove 206 is located at a consistent distance from second open end 202 of exhaust port flexible coupling 200. In a preferred embodiment, inner groove 206 is located sufficiently distant from second open end 202 that second end 251 of condensate trap 250 does not come into contact with exhaust port annular rim 102 after the condensate bypass apparatus is installed. As before, for proper operation of this embodiment of a condensate bypass apparatus according to the present invention, first end 420 of exhaust pipe 400 must not be in contact with condensate trap 250 after installation.

Figure 9B:
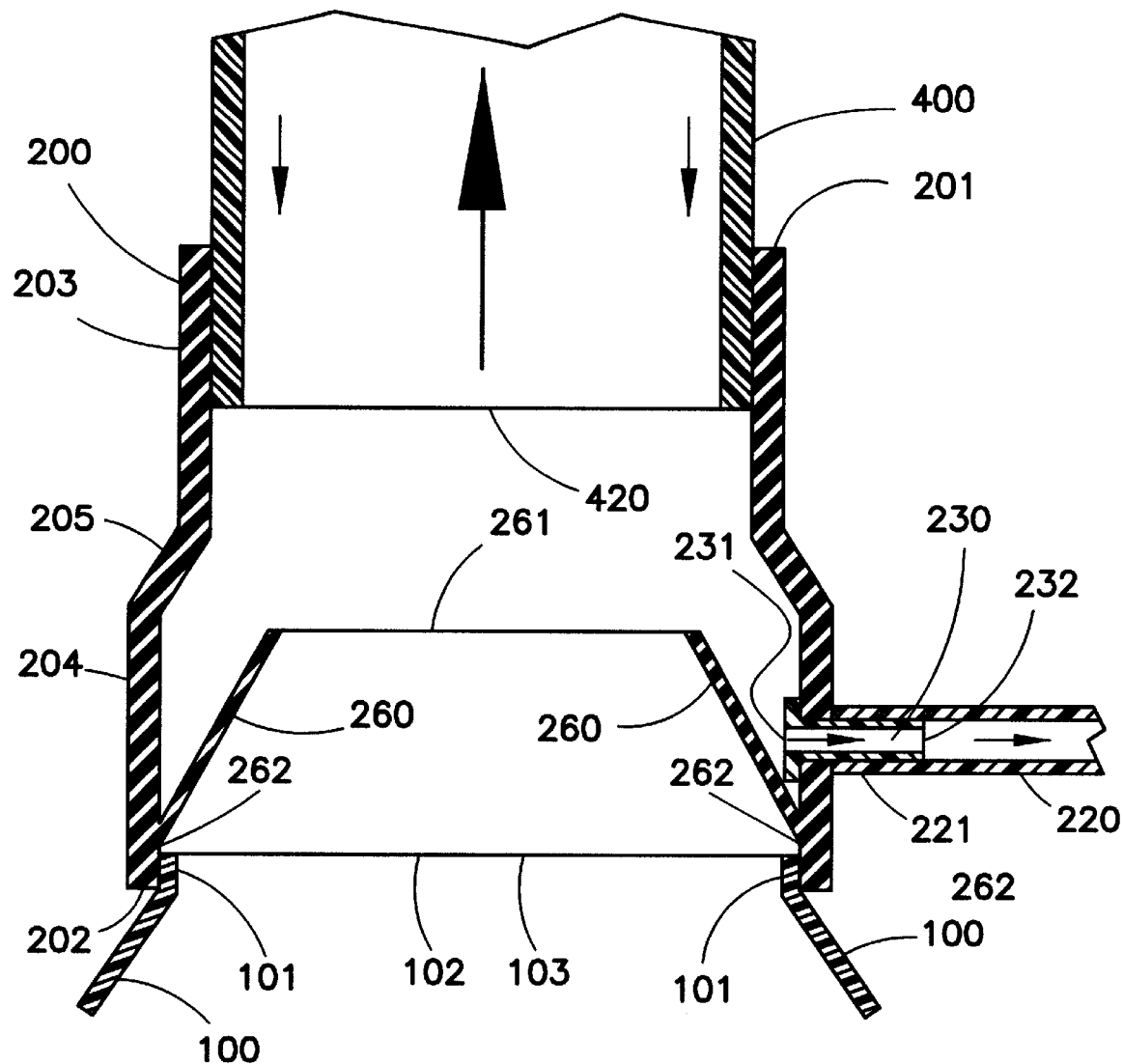
FIG. 9B shows a cross sectional side view of a fifth embodiment of an improved condensate bypass apparatus according to the present invention.

FIG. 9B shows a cross sectional side view of another embodiment of an improved condensate bypass apparatus according to the present invention. Shown in FIG. 9B is condensate diverter 260. Condensate diverter 260 comprises an upturned, annular lip molded inside flexible coupling 200 to form a gutter inside flexible coupling 200. First end 261 of condensate diverter 260 comprises a diameter smaller than the inner diameter of exhaust pipe 400. Preferably, the diameter of first end 261 is only slightly smaller than the inner diameter of exhaust pipe 400, to provide as little impediment as possible to the airflow. Second end 262 is integral with the inner surface of exhaust port flexible coupling 200. Bypass tube fitting 230 and bypass tube 220 are assembled as previously described herein. Bypass tube fitting 230 must be installed above condensate diverter 260 to channel the condensate captured by condensate diverter 260 into bypass tube 220. For proper operation of this embodiment of a condensate bypass apparatus according to the present invention, first end 420 of exhaust pipe 400 must not be in contact with condensate diverter 260 after installation.

Figure 10:
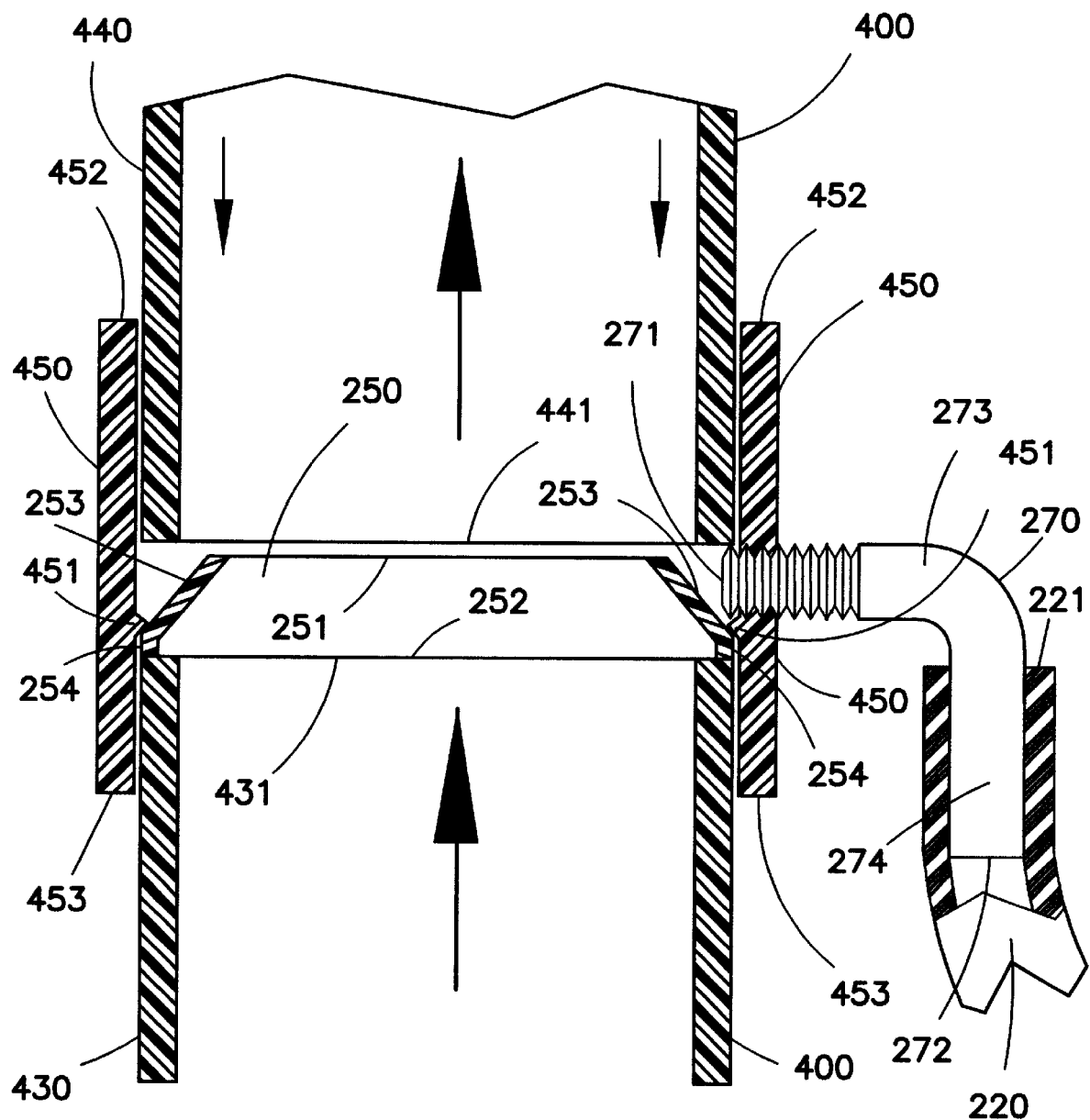
FIG. 10 shows a cross sectional side view of a sixth embodiment of an improved condensate bypass apparatus according to the present invention.

FIG. 10 shows a cross sectional side view of yet another embodiment of the condensate bypass apparatus according to the present invention. Shown in FIG. 10 is bypass tube 220, condensate trap 250, bypass tube fitting 270, exhaust pipe 400, and rigid coupling 450.

Exhaust pipe 400 comprises lower pipe 430 and upper pipe 440. Lower pipe 430 comprises first end 431. Upper pipe 440 comprises first end 441. Rigid coupling 450 comprises annular ring 451, first end 452, and second end 453. Rigid coupling 450 comprises a material of a type compatible with the materials chosen for lower pipe 430 and upper pipe 440. For example, rigid coupling 450 may comprise a PVC coupling of the type well known in the art.

Annular ring 451 comprises a thin annular member protruding from the inner surface of rigid coupling 450. Annular ring 451 is positioned approximately equidistant from first end 452 and second end 453 of rigid coupling 450, and restricts the inner diameter of rigid coupling 450. As shown in FIG. 10, annular ring 451 is formed in a triangular shape, but this is not required. Annular ring 451 may be rectangular, square, semi-circular, semi-elliptical, or another shape known in planar geometry.

Condensate trap 250 comprises a hollow device of unitary construction comprising a first segment and a second segment. The first segment of condensate trap 250 is formed into a truncated conical shape with a sloping outer surface 253 terminating in first open end 251. The second segment of condensate trap 250 is formed into a cylindrical shape having a vertical outer surface 254 terminating in second open end 252. A continuous hollow interior communicates between first open end 251 and second open end 252. Condensate trap 250 preferably is constructed from a corrosion-resistant material, such as stainless steel or a plastic material.

First open end 251 comprises a diameter smaller than second open end 252. Second open end 252 comprises a diameter slightly smaller than that circumscribed by the inner surface of rigid coupling 450. First open end 251 comprises a diameter smaller than the inner diameter of upper pipe 440. Preferably, the diameter of first open end 251 is only slightly smaller than the inner diameter of upper pipe 440, to provide as little impediment to airflow as possible.

Bypass tube fitting 270 comprises a hollow tube having a first leg 273 terminating in a first open end 271, a second leg 274 terminating in a second open end 272, and a continuous hollow interior communicating between first open end 271 and second open end 272. Bypass tube fitting 270 preferably is constructed from a substantially rigid, corrosion-resistant material, such as stainless steel or alsubstantially rigid plastic material. A portion of the external surface of first leg 273 comprises threads. Second end 272 of tube fitting 270 is sized to mate with end 221 of bypass tube 220. In the embodiment shown in FIG. 10, bypass tube fitting 270 is provided in a right angle configuration, but this is not required. Bypass tube fitting 270 may be straight, or may be configured in an angle other than a right angle. Preferably, bypass tube fitting 270 is not configured in an acute angle.

The condensate bypass apparatus shown in FIG. 10 is assembled according to the following process. First, a hole of a predetermined size is made through rigid coupling 450, and internally threaded. The hole through rigid coupling 450 is sized to receive first open end 271 and threaded to mate with first leg 273. Bypass tube fitting 270 is inserted into the hole from the outside of rigid coupling 450 by engaging the external threads on first leg 273 with the internal threads in the hole through rigid coupling 450. Bypass tube fitting 270 is inserted in this manner until a length of first leg 273 protrudes into the hollow interior of rigid coupling 450. First leg 273 must protrude into the hollow interior of rigid coupling 450 to the extent necessary to obstruct the passage of upper pipe 440 through rigid coupling 450 during installation, as further discussed hereinafter. First end 221 of bypass tube 220 then is fitted over second end 272. First end 221 of bypass tube 220 is retained on second leg 274 of bypass tube fitting 270, such as by friction, by use of an adhesive, or by use of an appropriate strap fastener. The external surface of second leg 274 of bypass tube fitting 270 may comprise one or more annular barbs which enhance the retention of first end 221 of bypass tube 220 thereon.

Next, condensate trap 250 is installed within rigid coupling 450. In the embodiment shown in FIG. 10, condensate trap 250 is inserted through end 453 of rigid coupling 450 until outer surface 253 of condensate trap 250 is proximately engaged against a surface of annular ring 451. In some implementations of the present invention, condensate trap 250 may be held in place through the use of an adhesive applied between outer surface 254 of condensate trap 250, and the inner surface of rigid coupling 450.

After bypass tube 220 and condensate trap 250 are in place, end 431 of lower pipe 430 is inserted through end 453 of rigid coupling 450 until it abuts against second open end 252 of condensate trap 250. Next, end 441 of upper pipe 440 is inserted through end 452 of rigid coupling 450 until it abuts against first leg 273 of bypass tube fitting 270. End 441 must not be in contact with condensate trap 250 after installation. Lower pipe 430 and upper pipe 440 then are secured to rigid coupling 450 by means known in the art, such as by use of an adhesive. Finally, second end 222 of bypass tube 220 is engaged with suction pipe 500 as previously described herein.

Figure 11:
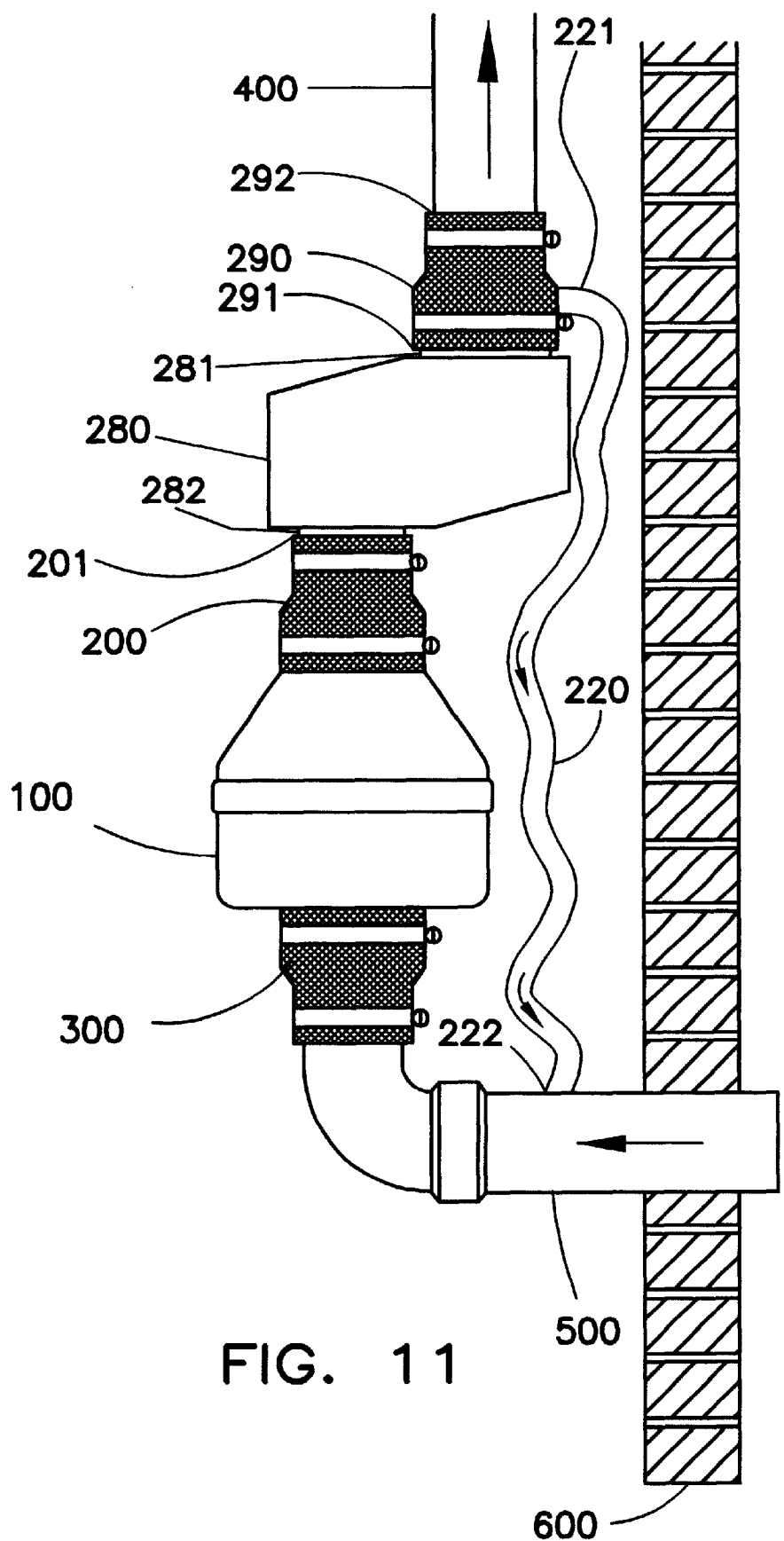
FIG. 11 shows a side elevational view of an alternative configuration of an improved condensate bypass apparatus according to the present invention.

FIG. 11 shows a side elevational view of yet another configuration of a condensate bypass system according to the present invention. Shown in FIG. 11 are exhaust fan housing 100, exhaust port flexible coupling 200, transition box 280, transition box flexible coupling 290, suction port flexible coupling 300, exhaust pipe 400, and suction pipe 500.

Transition box 280 comprises a hollow box conduit comprising a first open end 281 and a second open end 282. Transition box flexible coupling 290 comprises a flexible, hollow coupling of the type well-known in the art having a first open end 291 and a second open end 292. In FIG. 11, first open end 292 of transition box flexible coupling 290 is of one diameter and engaged with the first open end 281 of transition box 280, and the second open end 292 of transition box flexible coupling 290 is of a second diameter and engaged with exhaust pipe 400. Second open end 292 of transition box 280 is engaged with first open end 201 of exhaust port flexible coupling 200. In this arrangement, transition box 280 and transition box flexible coupling 290 together form a conduit communicating between exhaust port flexible coupling 200 and exhaust pipe 400. Circumscribing transition box flexible coupling 290 near each of first open end 291 and second open end 292 is an adjustable band which may be tightened after flexible coupling 290 is installed to secure flexible coupling 290 in place and to provide airtightness to the conduit formed by the flexible coupling. Transition box flexible coupling 290 may comprise a rubber coupling of a type well known in the art, or a coupling constructed of another flexible material capable of airtightly joining two conduits.

It will be appreciated by those of skill in the art that the condensate bypass apparatuses shown in FIGS. 6, 7, and 8 may be readily adapted for use at the junction between transition box 280 and transition box flexible coupling 290. Likewise, it will be appreciated by those of skill in the art that transition box flexible coupling 290 may be readily adapted to incorporate the condensate bypass apparatus shown in FIGS. 9A and 9B for use inside transition box flexible coupling 290.

In the embodiments of radon mitigation system 10 shown and described herein, fan housing 100, exhaust port flexible coupling 200, suction port flexible coupling 300, exhaust pipe 400, and suction pipe 500 each are discussed in terms of a device comprising a substantially circular cross-section. In fact, each of fan housing 100, exhaust port flexible coupling 200, suction port flexible coupling 300, exhaust pipe 400, and suction pipe 500 may comprise a cross-section that is square, circular, elliptical, or another shape known in planar geometry, and still fall within the scope of the present invention.

The materials chosen for each of the component parts of each of the embodiments of radon mitigation system 10 and the condensate bypass apparatus of the present invention are left to the discretion of the practitioner. Materials should be chosen based on their cost and ability to resist corrosion from the moist air passing through the system, and from exposure to the external environment.

The present invention comprises an apparatus for diverting the condensate that forms inside the exhaust pipe in a radon mitigation system. An apparatus according to the present invention is easily installed, economic to manufacture, reasonably priced, and reliably constructed of readily available materials so that it will withstand exposure to the outdoor elements over many years of use.

Those of skill in the art will appreciate that the principles of the present invention may be readily adapted for use outside of the field of radon mitigation. Any exhaust system wherein relatively warm air comprising a high relative humidity is chilled below its dew point will suffer from the condensate formation problem discussed herein. A condensate bypass apparatus according the present invention installed in such an exhaust system will divert the condensate which forms inside such as system away from the system's exhaust fan, thereby increasing the useful life of the exhaust fan.

While this invention has been described as having a preferred design, the present invention can be further modified within the scope and spirit of this disclosure. This application is therefore intended to cover any variation, uses, or adaptation of the invention using its general principal. Further, this application is intended to cover such departures from the present disclosure as come within known or customary practices in the art to which this invention pertains and which fall within the limits of the appended claims.

I claim:

1. A condensate bypass apparatus for diverting condensate which forms inside an exhaust system, said exhaust system comprising an exhaust side having a hollow interior and an inner surface on which condensate may be formed, a suction side having a hollow interior, and an exhaust fan apparatus interposed between said exhaust side and said suction side and coupled to each of said exhaust side and said suction side to form a conduit through which a gaseous fluid may be conveyed, wherein said gaseous fluid is drawn by said exhaust fan apparatus from said suction side and expelled by said exhaust fan apparatus through said exhaust side, said condensate bypass apparatus comprising:

a tube having a first open end and a second open end and a continuous hollow interior communicating between said first open end and said second open end, said first open end communicating through said exhaust side to said hollow interior thereof and said second open end communicating through said suction side to said hollow interior thereof so that said hollow interior of said tube communicates between said exhaust side and said suction side in a manner bypassing said exhaust fan apparatus; and a condensate trap comprising a first open end having a first diameter, a second open end having a second diameter, and a continuous hollow interior communicating between said first open end and said second open end, wherein said first diameter of said first open end is less than said second diameter of said second open end and said condensate trap has a conically-shaped sloping outer surface, said second diameter being dimensioned to fit within said exhaust side, said second open end arranged within said exhaust side in a manner forming a gutter comprising said inner surface of said exhaust side and said sloping outer surface of said condensate trap, with the axis of said condensate trap substantially coincident with the axis of said exhaust side, said gutter positioned to collect condensate which may drain within said exhaust side.

2. The condensate bypass apparatus of claim 1, wherein said exhaust system is a radon mitigation system.

3. The condensate bypass apparatus of claim 1, wherein said gaseous fluid comprises radon gas.

4. An exhaust system for removing a radon containing gaseous fluid comprising:

an exhaust fan apparatus comprising a housing having an exhaust port and a suction port and enclosing a fan, wherein the operation of said fan draws a gaseous fluid into said suction port and expels said gaseous fluid from said exhaust port;

a cylindrical suction conduit comprising a hollow interior, a first open end, and at least one other open end, said hollow interior communicating between said first open end and each of said at least one other open ends, said suction pipe being otherwise substantially airtight, wherein said first open end is substantially airtightly coupled with said suction port and each of said at least one other open ends is located proximate to said gaseous fluid so that said gaseous fluid is conducted by operation of said fan from each of said at least one other open ends of said suction conduit through said suction conduit to said suction port;

a cylindrical exhaust conduit comprising a hollow interior, a first open end, at least one other open end, and an inner surface, said hollow interior communicating between said first open end and each of said at least one other open ends, said exhaust pipe being otherwise substantially airtight, wherein said first open end is substantially airtightly coupled to said exhaust port each of said at least one other open ends is located at a predetermined level above ground level so that said gaseous fluid is conducted by operation of said fan from said exhaust port through said exhaust conduit to each of said at least one other open ends of said exhaust conduit;

a condensate trap located within said exhaust conduit, said condensate trap comprising a first open end having a first diameter, a second open end having a second diameter, and a continuous hollow interior communicating between said first open end and said second open end, wherein said first diameter of said first open end is less than said second diameter of said second open end and said condensate trap has a conically-shaped sloping outer surface, said second diameter being dimensioned to fit within said exhaust conduit, said second open end of said condensate trap being arranged within said exhaust conduit in a manner forming a gutter comprising said inner surface of said exhaust conduit and said sloping outer surface of said condensate trap, with the axis of said condensate trap substantially coincident with the axis of said exhaust conduit, said gutter positioned to collect condensate which may drain within said exhaust conduit; and a bypass tube comprising a hollow interior having a first open end and a second open end, said hollow interior communicating between said first open end and said second open end, said first open end of said bypass tube communicating through said exhaust conduit to said hollow interior thereof immediately adjacent to said conical surface of said condensate trap and within said gutter, and said second open end of said bypass tube communicating through said suction conduit to said hollow interior thereof in a manner bypassing said exhaust fan, whereby said condensate may be received from said gutter by said bypass tube and conducted through said bypass tube into said suction conduit.

5. The exhaust system of claim 4, wherein said second open end of said condensate trap is integral with said housing of said exhaust fan apparatus.

6. The exhaust system of claim 4, wherein said second open end of said condensate trap is integral with said inner surface of said exhaust conduit.

7. The exhaust system of claim 4, wherein said housing of said exhaust fan apparatus comprises an annular exhaust port rim having a diameter substantially the same as said second diameter of said second open end of said condensate trap, and wherein said condensate trap is placed on said annular exhaust port rim with said second open end of said condensate trap engaged against said annular exhaust port rim substantially throughout the entire circumference thereof.

8. The exhaust system of claim 4, wherein said first open end of said exhaust conduit comprises:

a flexible coupling comprising a hollow interior, a first open end, a second open end, and an inner surface, said hollow interior communicating between said first open end and said second open end, said first open end being substantially airtightly coupled to said exhaust conduit, and said second open end being substantially airtightly coupled to said exhaust port.

9. The exhaust system of claim 8, wherein said second open end of said condensate trap is integral with said inner surface of said flexible coupling.

10. The exhaust system of claim 8, wherein said inner surface of said flexible coupling comprises an annular groove, wherein said second open end of said condensate trap is retained within said annular groove.

11. The exhaust system of claim 4, wherein said first open end of said suction conduit comprises:

a flexible coupling comprising a hollow interior, a first open end, and a second open end, said hollow interior communicating between said first open end and said second open end, said first open end of said flexible coupling being substantially airtightly coupled to said suction port, and said second open end of said flexible coupling being substantially airtightly coupled to said suction conduit.

12. The exhaust system of claim 4, further comprising:

a bypass tube fitting comprising a hollow interior, a first open end, and a second open end, said hollow interior communicating between said first open end and said second open end, said first open end comprising an annular flange perpendicular to the axial direction of said bypass tube fitting, wherein a surface of said annular flange is engaged against said inner surface of said exhaust conduit, and a portion of said bypass tube fitting passes through a wall of said exhaust conduit, thereby resulting in said second open end of said bypass tube fitting being outside said exhaust conduit, and wherein said first open end of said bypass tube fitting is positioned within said exhaust conduit to receive condensate from said gutter, and said first open end of said bypass tube is coupled with said second open end of said bypass tube fitting so that said hollow interior of said bypass tube communicates with said hollow interior of said exhaust conduit through said hollow interior of said bypass tube fitting.

13. The exhaust system of claim 4, further comprising a bypass tube fitting comprising a hollow interior, a first open end, and a second open end, said hollow interior communicating between said first open end and said second open end, said bypass tube fitting comprising external threads adjacent to said first open end, wherein a portion of said bypass tube fitting passes through a wall of said exhaust conduit, thereby resulting in said second open end of said bypass tube fitting being outside said exhaust conduit and said first open end of said bypass tube fitting being positioned within said exhaust conduit to receive condensate from said gutter, and wherein said second open end of said bypass tube is coupled with said first open end of said bypass tube fitting so that said hollow interior of said bypass tube communicates with said hollow interior of said exhaust conduit through said hollow interior of said bypass tube fitting.

14. The exhaust system of claim 4, further comprising:

a bypass tube fitting comprising a hollow interior, a first open end, and a second open end, said hollow interior communicating between said first open end and said second open end, said bypass tube fitting comprising external threads adjacent to said first open end, wherein a portion of said bypass tube fitting passes through a wall of said suction conduit, thereby resulting in said second open end of said bypass tube fitting being outside said suction conduit and said first open end of said bypass tube fitting being positioned within said suction conduit to deliver condensate to said suction conduit, and wherein said second open end of said bypass tube is coupled with said second open end of said bypass tube fitting so that said hollow interior of said bypass tube communicates with said hollow interior of said suction conduit through said hollow interior of said bypass tube fitting.

15. The exhaust system of claim 4, wherein said exhaust conduit comprises a rigid coupling comprising:

a hollow interior having an inner surface, a first open end, a second open end, and an annular member protruding from said inner surface into said hollow interior, said hollow interior communicating between said first open end and said second open end, wherein said condensate trap is arranged within said rigid coupling with said sloping outer surface of said condensate trap engaged against a surface of said annular member.

16. A condensate trap apparatus for collecting condensate which drains within an exhaust system comprising:

a cylindrical flexible coupling comprising a hollow interior having an inner surface, a first open end, and a second open end, said hollow interior communicating between said first open end and said second open end;

a condensate trap located within said flexible coupling, said condensate trap comprising a first open end having a first diameter, a second open end having a second diameter, and a continuous hollow interior communicating between said first open end and said second open end, wherein said first diameter of said first open end is less than said second diameter of said second open end and said condensate trap has a conically-shaped sloping outer surface, said second diameter being dimensioned to fit within said flexible coupling, said second open end of said condensate trap being arranged within said flexible coupling in a manner forming a gutter comprising said inner surface of said flexible coupling and said sloping outer surface of said condensate trap, with the axis of said condensate trap substantially coincident with the axis of said flexible coupling, said gutter positioned to collect condensate which may drain within said flexible coupling; and a bypass tube comprising a hollow interior having a first open end and a second open end, said hollow interior communicating between said first open end and said second open end, said first open end of said bypass tube communicating through said flexible coupling to said hollow interior thereof immediately adjacent to said conical surface of said condensate trap and within said gutter, whereby said condensate may be received from said gutter by said first open end of said bypass tube and conducted through said bypass tube until emerging from said second open end of said bypass tube.

17. The condensate trap apparatus of claim 16, wherein said second open end of said condensate trap is integral with said inner surface of said flexible coupling.

18. The condensate trap apparatus of claim 16, wherein said inner surface of said flexible coupling comprises an annular groove, wherein said second open end of said condensate trap is retained within said annular groove.

19. A condensate trap apparatus for collecting condensate which drains within an exhaust system comprising:

a cylindrical rigid coupling comprising a hollow interior having an inner surface, a first open end, a second open end, and an annular member protruding from said inner surface into said hollow interior, said hollow interior communicating between said first open end and said second open end;

a condensate trap located within said rigid coupling, said condensate trap comprising a first open end having a first diameter, a second open end having a second diameter, and a continuous hollow interior communicating between said first open end and said second open end, wherein said first diameter of said first open end is less than said second diameter of said second open end and said condensate trap has a conically-shaped sloping outer surface, said second diameter being dimensioned to fit within said rigid coupling, said second open end of said condensate trap being arranged within said rigid coupling in a manner forming a gutter comprising said inner surface of said rigid coupling and said sloping outer surface of said condensate trap, with the axis of said condensate trap substantially coincident with the axis of said rigid coupling, said gutter positioned to collect condensate which may drain within said rigid coupling; and a bypass tube comprising a hollow interior having a first open end and a second open end, said hollow interior communicating between said first open end and said second open end, said first open end of said bypass tube communicating through said rigid coupling to said hollow interior thereof immediately adjacent to said conical surface of said condensate trap and within said gutter, whereby said condensate may be received from said gutter by said first open end of said bypass tube and conducted through said bypass tube until emerging from said second open end of said bypass tube.

* * * * *